(12) United States Patent
Thomson (10) Patent No.: US 11,794,281 B2
(45) Date of Patent: Oct. 24, 2023

(54) LASER PROCESSING

(71) Applicant: RENISHAW PLC, Wotton-under-Edge (GB)

(72) Inventor: Ian James Thomson, Rosyth (GB)

(73) Assignee: RENISHAW PLC, Wotton-under-Edge (GB)

(*) Notice: Subject to any disclaimer, the term of this patent is extended or adjusted under 35 U.S.C. 154(b) by 572 days.

(21) Appl. No.: 16/635,808

(22) PCT Filed: Aug. 8, 2018

(86) PCT No.: PCT/GB2018/052258
§ 371 (c)(1),
(2) Date: Jan. 31, 2020

(87) PCT Pub. No.: WO2019/030522
PCT Pub. Date: Feb. 14, 2019

(65) Prior Publication Data
US 2021/0129426 A1 May 6, 2021

(30) Foreign Application Priority Data
Aug. 9, 2017 (GB) .................................. 1712739

(51) Int. Cl.
*B23K 26/342* (2014.01)
*B29C 64/153* (2017.01)
(Continued)

(52) U.S. Cl.
CPC ............ *B23K 26/342* (2015.10); *B22F 10/28* (2021.01); *B22F 12/49* (2021.01);
(Continued)

(58) Field of Classification Search
CPC ........ B22F 10/20; B22F 10/30; B22F 3/1055; B22F 2003/1056; B22F 2003/1057;
(Continued)

(56) References Cited

U.S. PATENT DOCUMENTS 5,684,642 A * 11/1997 Zumoto ............... B23K 26/066
385/38
6,042,774 A 3/2000 Wilkening et al.
(Continued)

FOREIGN PATENT DOCUMENTS

CN 106541136 A 3/2017
DE 39 05 551 A1 8/1990
(Continued)

OTHER PUBLICATIONS

Saffman, et al., "Comparison of Gaussian and super Gaussian laser beams for addressing atomic qubits", Appl. Phys. B (2016) 122:131, p. 2, Apr. 2016.*
(Continued)

*Primary Examiner* — Philip C Tucker
*Assistant Examiner* — Jimmy R Smith, Jr.
(74) *Attorney, Agent, or Firm* — Oliff PLC (57) ABSTRACT

A method of laser processing including generating a laser beam having, at different longitudinal positions in a propagation direction, first and second transverse beam profiles of energy density. The first transverse beam profile is different to the second transverse beam profile and is non-Gaussian. The method includes carrying out a scan of the laser beam across a working surface, wherein, during the scan, the laser beam and/or working surface is adjusted such that, for a first part of the scan, the first transverse beam profile is located at the working surface and, for a second part of the scan, the second transverse beam profile is located at the working surface.

19 Claims, 10 Drawing Sheets

(51) Int. Cl.
| | |
|---|---|
| *B23K 26/06* | (2014.01) |
| *B23K 26/34* | (2014.01) |
| *B22F 10/28* | (2021.01) |
| *B22F 12/49* | (2021.01) |
| *B33Y 10/00* | (2015.01) |
| *B22F 10/36* | (2021.01) |
| *B22F 10/366* | (2021.01) |
| *B23K 26/082* | (2014.01) |
| *B29C 64/393* | (2017.01) |
| *B29C 64/286* | (2017.01) |
| *B29C 64/268* | (2017.01) |
| *B33Y 30/00* | (2015.01) |
| *B33Y 50/02* | (2015.01) |

(52) U.S. Cl.
CPC ...... *B23K 26/0626* (2013.01); *B23K 26/0643* (2013.01); *B23K 26/0648* (2013.01); *B23K 26/0652* (2013.01); *B23K 26/082* (2015.10); *B23K 26/34* (2013.01); *B29C 64/153* (2017.08); *B29C 64/268* (2017.08); *B29C 64/286* (2017.08); *B29C 64/393* (2017.08); *B22F 10/36* (2021.01); *B22F 10/366* (2021.01); *B33Y 10/00* (2014.12); *B33Y 30/00* (2014.12); *B33Y 50/02* (2014.12)

(58) Field of Classification Search
CPC ...... B22F 2003/1058; B22F 2003/1059; B22F 10/366; B22F 10/36; B23K 26/0626; B23K 26/0643; B23K 26/0648; B23K 26/0652; B23K 26/073; B23K 26/0732; B23K 26/0734; B23K 26/08; B23K 26/082; B23K 26/0876; B23K 26/0884; B23K 26/34; B23K 26/342; B29C 64/153; B29C 64/268; B29C 64/286; B29C 64/393; B29C 64/129; B29C 64/135; B29C 64/264; B29C 64/273; B29C 64/277; B29C 64/282; B29C 64/291; B29C 71/04; B29C 2035/0827; B29C 2045/0075; B29C 33/06; B29C 35/08; B33Y 10/00; B33Y 30/00; B33Y 50/02

See application file for complete search history.

(56) References Cited

U.S. PATENT DOCUMENTS

| | | | |
|---|---|---|---|
| 6,864,043 | B2 * | 3/2005 | Neal ................. G02B 27/58 430/323 |
| 7,630,147 | B1 | 12/2009 | Kar et al. |
| 9,527,246 | B2 | 12/2016 | Wiesner et al. |
| 2005/0084620 | A1 | 4/2005 | Schuurman et al. |
| 2012/0267345 | A1 | 10/2012 | Clark et al. |
| 2013/0064706 | A1 | 3/2013 | Schwarze et al. |
| 2013/0134637 | A1 * | 5/2013 | Wiesner ............ B23K 26/067 264/497 |
| 2013/0183493 | A1 * | 7/2013 | Grebe ................ B29C 64/182 428/156 |
| 2015/0009583 | A1 | 1/2015 | Suleski et al. |
| 2015/0239063 | A1 | 8/2015 | Martinsen |
| 2019/0151985 | A1 * | 5/2019 | Sbetti ................ B23K 26/082 |

FOREIGN PATENT DOCUMENTS

| | | |
|---|---|---|
| EP | 0 062 517 A1 | 10/1982 |
| JP | H09-001674 A | 1/1997 |
| WO | 2010/007396 A1 | 1/2010 |

OTHER PUBLICATIONS

May 7, 2019 Search Report issued in International Patent Application No. PCT/GB2018/052258.

May 7, 2019 Written Opinion of the International Searching Authotiy issued in International Patent Application No. PCT/GB2018/052258.

Jan. 24, 2018 Search Report issued in British Patent Application No. GB1712739.0.

* cited by examiner

LASER PROCESSING

FIELD OF INVENTION

This invention concerns laser processing and in particular, but not exclusively, selectively fusing material in an additive manufacturing process using a laser beam, such as a powder bed fusion process.

BACKGROUND

Powder bed fusion apparatus, such as selective laser melting (SLM) and selective laser sintering (SLS) apparatus, produce objects through layer-by-layer solidification of a material, such as a metal powder material, using a high-energy beam, such as a laser beam. A powder layer is formed across a powder bed in a build chamber by depositing a heap of powder adjacent to the powder bed and spreading the heap of powder with a wiper across (from one side to another side of) the powder bed to form the layer. A laser beam is then scanned across areas of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. An example of such a device is disclosed in U.S. Pat. No. 6,042,774.

There is a desire to scale the optical power incident upon the powder bed within a powder bed fusion apparatus to increase a speed at which the powder bed can be processed. However, due to the Gaussian transverse beam distribution of a typical materials processing laser, increasing the optical power incident upon the powder bed can cause portions of the beam to be above the vaporisation threshold of the powder material. Vaporising material can result in porous regions in the part being built.

To remain below the ablation threshold of the material, reshaping the transverse beam distribution into another profile is required.

US2005/0084620 A1 discloses a stereolithography process, wherein a laser beam with a modified "top-hat" distribution is used.

US2012/0267345 A1 discloses a method of manufacturing a component by material deposition, for example by weld deposition or powder bed layer deposition. The apparatus comprises a deformable mirror located in the beam path for adjusting an energy intensity profile of the laser beam.

US2013/0064706 A1 describes use of a diffractive optical element to split a first laser beam into at least two laser sub-beams, each sub-beam having a beam profile with a Gaussian distribution. The alleged advantage of this splitting of the laser beam is that a larger region of the powder layer can be irradiated simultaneously than without splitting of the laser beam, which increases the speed of production process and accordingly, the productivity. In addition, intensity peaks are reduced or avoided.

SUMMARY OF INVENTION

According to a first aspect of the invention there is provided a method of laser processing comprising generating a laser beam having, at different longitudinal positions in a propagation direction, first and second transverse beam profiles of energy density, wherein the first transverse beam profile is different to the second transverse beam profile and is non-Gaussian, and carrying out a scan of the laser beam across a working surface, wherein, during the scan, the laser beam and/or working surface is adjusted such that, for a first part of the scan, the first transverse beam profile is located at the working surface and, for a second part of the scan, the second transverse beam profile is located at the working surface.

The second transverse beam profile may be Gaussian or Gaussian like.

In one embodiment, the first transverse beam profile is a flatter-top beam profile than the second transverse beam profile. The first transverse beam profile may have a measure of flatness that is greater than a measure of flatness of the second transverse beam profile. The measure of flatness may be one or more of a flatness factor, beam uniformity, plateau uniformity and edge steepness as defined within the EN ISO 13694-2001 standard.

The first transverse beam profile may have a flatness factor closer to 1 than the second transverse beam profile. The first transverse beam profile may have a beam uniformity closer to 0 than the second transverse beam profile. The first transverse beam profile may have a plateau uniformity closer to 1 than the second transverse beam profile. The first transverse beam profile may have edge steepness closer to 0 than the second transverse beam profile.

The first transverse beam profile may be flatter than a corresponding Gaussian profile having a corresponding (the same) total and peak energy. The first transverse beam profile may have a flatness factor closer to 1 than the corresponding Gaussian. The first transverse beam profile may have a beam uniformity closer to 0 than the corresponding Gaussian. The first transverse beam profile may have a plateau uniformity closer to 1 than the corresponding Gaussian. The first beam profile may have edge steepness closer to 0 than the corresponding Gaussian.

The flatter-topped beam profile will flatten the beam distribution, making a slightly wider but more uniform beam profile. This may allow a higher power laser beam to be used without vaporising the material.

The first transverse beam profile may be a super-Gaussian (of order greater than 1). The super-Gaussian may be a second order super-Gaussian. Higher orders of super-Gaussian have flatter-topped beam profiles but a smaller depth of field. Furthermore, diffraction effects during a transition to Gaussian are more evident at higher orders of super-Gaussian.

In a further embodiment, the first transverse beam profile is multi-peaked, i.e. has two or more local maxima. For example, the first transverse beam profile may have two local maxima, for example be pitch-fork shaped. In the plane transverse to the propagation direction, the first transverse beam profile may be ring-shaped.

The first transverse beam profile may be formed at a focal point of the laser beam. The second transverse beam profile may be formed away from a focal point of the laser beam. The laser beam and/or working surface may be adjusted by adjusting a relative position of the working surface to the focal point, for example, by adjusting a focal length of the laser beam or a propagation distance of the laser beam to the working surface.

Unlike a laser beam exhibiting a Gaussian beam profile at the focal point, a laser beam exhibiting a super-Gaussian beam profile at a particular transverse-plane, such as the focal point, does not exhibit a super-Gaussian beam profile away from this transverse plane. At other transverse planes, the laser beam exhibits Gaussian-like beam profiles. Shifting between these beam profiles allows one to select the beam profile that is appropriate for different portions of the laser process. As the peak intensity varies for the different beam profiles, the method may comprise adjusting the power of the laser beam when switching between the first transverse beam profile and the second transverse beam profile.

The laser process may comprise an additive manufacturing process, such as a powder bed fusion process, wherein the laser beam is used to solidify material to form a component. The method may comprise using the second transverse beam profile to solidify material to form component surfaces (borders) and using the first profile to solidify material to form a core of the component. In a powder bed fusion process, it is common to form layers of the component using a hull and core scan strategy, wherein a core of an area to be solidified is formed using a first scan strategy, so called fill scan, and a border of the area is solidified using a different scan strategy, so called border scan. The method may comprise using the first transverse beam profile for fill scans and using the second transverse beam profile for border scans.

According to a second aspect of the invention there is provided a laser processing apparatus comprising an optical scanner for scanning a laser beam across a working surface, the optical scanner comprising a beam profile reshaping device for shaping the laser beam such that the laser beam has, at different longitudinal positions in a propagation direction, first and second transverse beam profiles of energy density, wherein the first transverse beam profile is different to the second transverse beam profile and is non-Gaussian; and an adjustment device for dynamically adjusting the laser beam and/or working surface during the scan such that, for a first part of the scan, the first transverse beam profile can be located at the working surface and, for a second part of the scan, the second transverse beam profile can be located at the working surface The adjustment device may comprise an optical element for optically adjusting the laser beam. The adjustment device may comprise movable focussing optics of the scanner, wherein the focussing optics is controllable to adjust a location of a focal point of the laser beam relative to the working surface. The adjustment device may comprise a spatial delay line in the scanner for adjusting a propagation distance for the laser beam to the working surface. The spatial delay line may comprise a corner cube or pair of mirrors adjustable to vary a path length of the laser beam to the working surface.

The adjustment device may comprise a device to generate a change in optical path length. For example, the adjustment device may comprise a plane-surface optic that is movable in and out of the laser beam path, the plane surface optic having a thickness and a refractive index such that movement of the plane-surface optic into the laser beam switches between the first transverse beam profile and second transverse beam profile being located at the working surface. The plane-surface optic may comprise a low loss coating and/or a low bulk absorption to ensure that thermal lenses are not created at a surface of the plane-surface optic.

The beam profile reshaping device may be located relative to the optical adjustment device such that the laser beam passes through the beam profile reshaping device before passing through the optical adjustment device.

The beam profile reshaping device may comprise one or more (separate) bulk optical elements. Alternatively, the beam profile reshaping device may comprise an output surface of a beam delivery optic for shaping a beam profile of the laser beam delivered using the beam delivery optic.

The beam delivery optic may be an optical fibre, such as an optical fibre of a fibre laser, and the output surface an end cap of the optical fibre.

The scanner may comprise movable steering optics for steering the laser beam across the working surface, the beam profile reshaping device and, optionally, the optical adjustment device, located such that the laser passes through the beam profile reshaping device and, optionally, the optical adjustment device, before being deflected by the steering optics.

The laser processing apparatus may further comprise a controller for controlling the scanner and the adjustment device, the controller arranged to control the scanner and the adjustment device such that, during the scan, the laser beam and/or working surface is adjusted such that, for a first part of the scan, the first transverse beam profile is located at the working surface and, for a second part of the scan, the second transverse beam profile is located at the working surface.

The laser processing apparatus may comprise an additive manufacturing apparatus, such as a powder bed fusion apparatus, in which the laser beam is used to solidify material in a layer-by-layer manner to form a component.

According to a third aspect of the invention there is provided a method of additively manufacturing a component comprising using a laser beam to solidify material in a layer-by-layer manner to form the component, wherein the laser beam has a super-Gaussian beam profile.

According to a fourth aspect of the invention there is provided an additive manufacturing apparatus, such as a powder bed fusion apparatus, in which the laser beam is used to solidify material in a layer-by-layer manner to form a component, the additive manufacturing apparatus comprising an optical scanner for scanning a laser beam across a working surface, the optical scanner comprising a beam profile reshaping device for shaping the laser beam to have a super-Gaussian beam profile.

According to a fifth aspect of the invention there is provided a method of laser processing comprising generating a laser beam having a first transverse beam profile and a second transverse beam profile at different propagation distances along the laser beam, the first transverse beam profile being different to the second transverse beam profile, and carrying out a scan of the laser beam across a working surface, wherein, during the scan, a relative position of the working surface to a propagation distance of the laser beam is adjusted such that, for a first part of the scan, the first transverse beam profile is located at the working surface and, for a second part of the scan, the second transverse beam profile is located at the working surface.

The second transverse beam profile may comprise a Gaussian or Gaussian-like shape, different to the first transverse beam profile, which may comprise a flatter top shape or a multi-peaked shape.

The relative position of the working surface to a propagation distance of the laser beam may be adjusted using a spatial delay line. The spatial delay line may comprise a corner cube adjustable to vary a path length of the laser beam to the working surface.

According to a sixth aspect of the invention there is provided a laser processing apparatus comprising an optical scanner for scanning a laser beam across a working surface, the optical scanner comprising a beam profile reshaping device for shaping the laser beam such that the laser beam comprises a first transverse beam profile and a second transverse beam profile at different propagation distances along the laser beam, the first transverse beam profile being different to the second transverse beam profile; and an adjustment device for dynamically adjusting a relative position of the working surface to a propagation distance of the laser beam during a scan such that, for a first part of the scan, the first transverse beam profile can be located at the working surface and, for a second part of the scan, the second transverse beam profile can be located at the working surface.

According to a seventh aspect of the invention there is provided a controller for controlling apparatus according to the second, fourth or sixth aspect of the invention to carry out the method of the first, third or fifth aspect of the invention, respectively.

According to an eighth aspect of the invention there is provided a data carrier having instructions thereon, which, when executed by a processor of apparatus according to the second, fourth or sixth aspect of the invention, causes the apparatus to carry out the method of the first, third or fifth aspect of the invention, respectively.

According to a ninth aspect of the invention there is provided a computer system for generating instructions for laser processing apparatus according to the second, fourth or sixth aspect of the invention, the computer system comprising a processor arranged to receive geometric data on an area of a working surface to be scanned by the laser beam and generate instructions for adjusting a location of the first transverse beam profile and the second transverse beam profile relative to the working surface during a scan of the laser beam across the area.

The laser processing apparatus may comprise an additive manufacturing process, such as a powder bed fusion process, wherein the laser beam is used to solidify material in a layer-by-layer manner to form a component. The processor may be arranged to generate instructions to locate the second transverse beam profile at the working surface to form component surfaces and locate the first transverse beam profile at the working surface to form a core of the component. In a powder bed fusion process, it is common to form layers of the component using a hull and core scan strategy, wherein a core of an area to be solidified is formed using a first scan strategy, so called fill scan, and a border of the area is solidified using a different scan strategy, so called border scan. The processor may be arranged to generate instructions to using the second transverse beam profile for border scans and the first transverse beam profile for fill scans.

According to a tenth aspect of the invention there is provided a data carrier having instructions stored thereon, which, when executed by a processor, causes the processor to receive geometric data on an area of a working surface to be scanned by the laser beam and generate instructions for adjusting a location of a first transverse beam profile and a second transverse beam profile relative to a working surface during a scan of a laser beam across the area in laser processing apparatus according to the second, fourth or sixth aspect of the invention.

The data carrier may be a non-transient data carrier, such as volatile memory, e.g. RAM, non-volatile memory, e.g. ROM, flash memory and data storage devices, such as hard discs, optical discs, or a transient data carrier, such as an electronic or optical signal.

According to an eleventh aspect of the invention there is provided a beam delivery optic wherein an output surface of the beam delivery optic forms a beam profile reshaping device for shaping a beam profile of a laser beam delivered using the beam delivery optic.

The beam profile reshaping device may form an output laser beam having a different beam profile from an input laser beam having a Gaussian beam profile. The output laser beam may be a laser beam having a super-Gaussian beam profile, which may, for example, be formed from an input laser beam having a Gaussian profile.

The beam delivery optic may be an optical fibre, such as an optical fibre of a fibre laser, and the output surface an end cap of the optical fibre.

DESCRIPTION OF THE DRAWINGS

FIG. 8$a$ is a plot showing variation in beam intensity with longitudinal position for a super-Gaussian beam of the order n=2;

FIG. 8$b$ is a plot showing variation in beam intensity with longitudinal position for a super-Gaussian beam of the order n=3;

FIG. 8$c$ is a plot showing variation in beam intensity with longitudinal position for a super-Gaussian beam of the order n=5;

DESCRIPTION OF EMBODIMENTS

Figure 1:
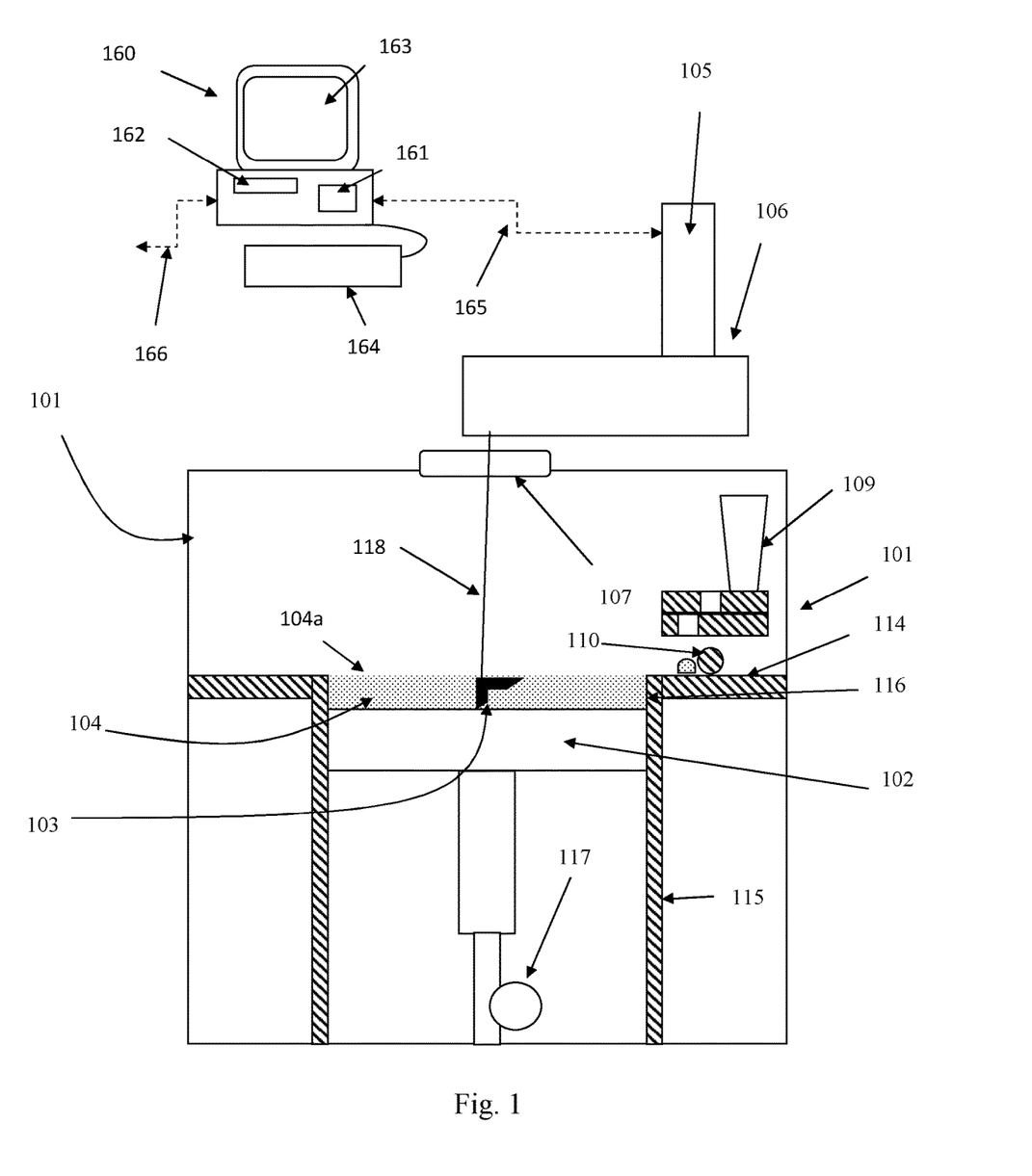
FIG. 1 shows a powder bed fusion apparatus according to an embodiment of the invention.
Figures 2, 3:
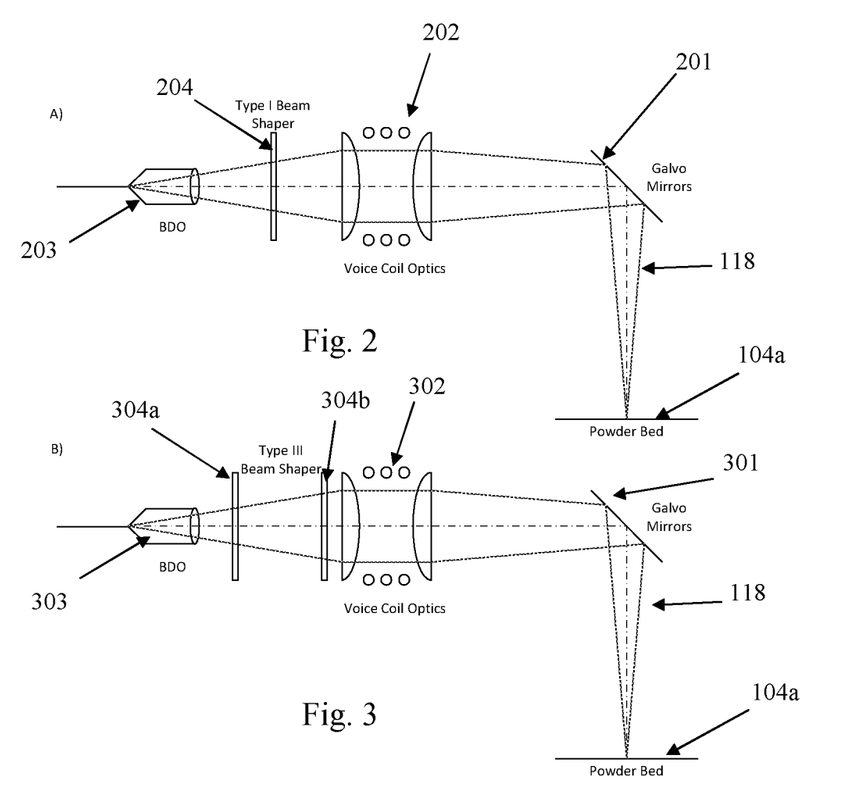
FIG. 2 shows an optical scanner according to an embodiment of the invention.
FIG. 3 shows an optical scanner according to another embodiment of the invention.

Referring to FIGS. 1 and 2, a selective laser melting (SLM) apparatus according to an embodiment of the invention comprises a build chamber 101 having therein a partition 115 that defines a sleeve in which a build platform 102 is lowerable. A further partition 114 defines a surface onto which powder can be deposited for spreading across an upper surface of the build platform 102 and/or the powder bed 104 to form a powder layer in a working plane 104$a$. The sleeve 115 and travel of the build platform 102 defines a build volume 116 in which an object 103 is built by selective laser melting powder 104. The platform 102 can be lowered within the build volume 116 using mechanism 117 as successive layers of the object 103 are formed.

Layers of powder 104 are formed as the object 103 is built by dispensing apparatus 109 and a wiper 110. For example, the dispensing apparatus 109 may be apparatus as described in WO2010/007396. A laser module 105 generates a laser for melting the powder 104, the laser directed onto a working surface 104$a$ of the powder bed 104 as required by optical module 106 under the control of a computer 160. The laser beam 118 enters the chamber 101 via a window 107.

Computer 160 comprises a processor unit 161, memory 162, display 163, user input device 164, such as a keyboard, touch screen, etc., a data connection to modules of the laser melting apparatus, such as optical module 106, laser module 105 and motors (not shown) that drive movement of the dispensing apparatus, wiper and build platform 102. An external data connection 166 provides for the uploading of scanning instructions to the computer 160. The laser unit 105, optical unit 106 and movement of build platform 102 are controlled by the computer 160 based upon the scanning instructions. Computer software is stored in memory 162 and execution of the computer program by processor 161 causes the computer to control the selective laser melting apparatus in accordance with the method described below.

FIG. 2 shows an optical train of the optical module 106 in detail. The optical module comprises steering optics in the form of two mirrors 201 (only one of which is shown) rotatable under the control of a galvanometer for steering of the laser beam 118 to selected locations on the working surface 104a. The optical train further comprises movable focussing optics 202 under the control of a voice coil for adjusting a position of the focal point of the laser beam 118 relative to the working surface 104a. The laser beam is delivered to the optical module using a beam delivery optic 203, such as an optical fibre of a fibre laser.

Located between the beam delivery optic 203 and the focussing optics 202 is a beam profile reshaping device 204 in the form of a refractive optical element. The refractive element 204 comprises one or more freeform surfaces shaped to reshape a phase and/or amplitude of the incident laser beam. The design of beam profile reshaping devices to provide a desired reshaping of the laser beam is described in "Laser Beam Shaping, Theory and Techniques, Fred M. Dickey, CRC Pres 2014".

For a single optic beam profile reshaping device, a high β factor is required. The β factor defines a quality of the shaped focal spot, where $$\beta = \frac{2\sqrt{2\pi}\, r_0 y_0}{f^2}$$

and $r_0$ is the $1/e^2$ radius of the incoming beam, $y_0$ the half-width of the desired spot and f the focal length of the processing lens. The β factor should be >10 for good performance. The single optic beam profile reshaping device introduces divergence into the system, meaning that the performance in terms of Rayleigh range, spot size, etc. will be worse than that of the original Gaussian beam.

Referring to FIG. 3, performance of the system can be improved through use of a double optic system as the beam profile reshaping device. In such an arrangement, a first optic 304a performs the reformatting of the beam and a second optic 304b, approximately 100 mm downstream of the first optic 304a, corrects the phase of the reformatted beam. Such a beam profile reshaping device can produce flat-top distributions with near single-mode diffraction limited performance.

In the drawings, the first type of beam profile reshaping device comprising a single optic is called a Type I beam profile reshaping device and the second type of optic comprising multiple optics is called a Type II beam profile reshaping device.

As an alternative to utilising bulk optic beam profile reshaping devices, it is possible to write the beam profile reshaping device into a surface of the end cap of the fibre laser 403. By direct writing of the shaping surface onto one of the existing optical components, the optical train comprises fewer surfaces, limiting the potential for failure and optical losses. Beam profile reshaping devices typically require very tight tolerances in an alignment of the laser beam with the beam profile reshaping device. Direct writing on the fibre optic circumvents this problem with the accurate alignment of separate optical components.

Figures 4, 5:
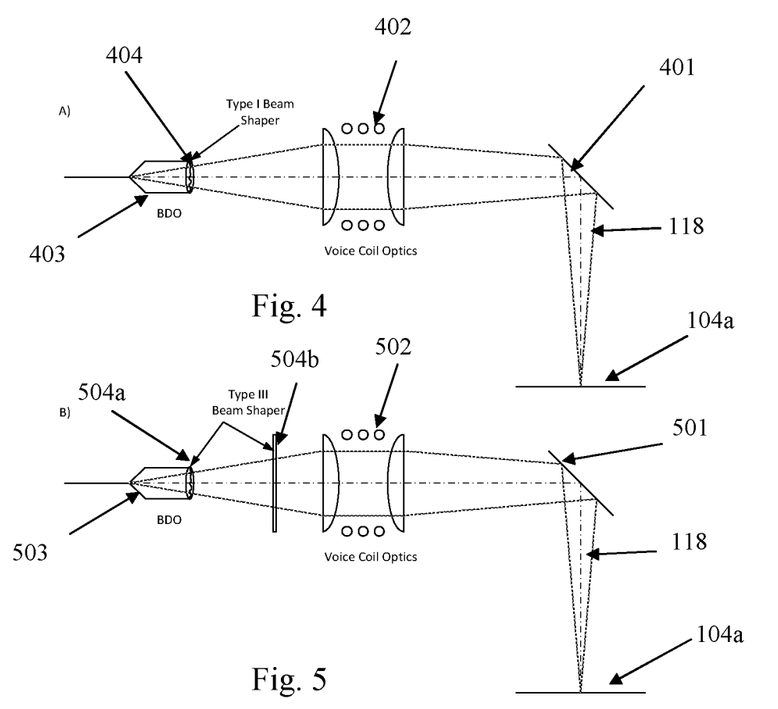
FIG. 4 shows an optical scanner according to yet another embodiment of the invention.
FIG. 5 shows an optical scanner according to a further embodiment of the invention.

FIG. 4 shows a system with a Type I beam profile reshaping device 404 directly written on to the end cap of the fibre optic and FIG. 5 shows a Type II beam profile reshaping device comprising a freeform surface 504a directly written onto the end cap of the fibre optic and a second optic 504b that corrects the phase of the laser beam.

Figure 6:
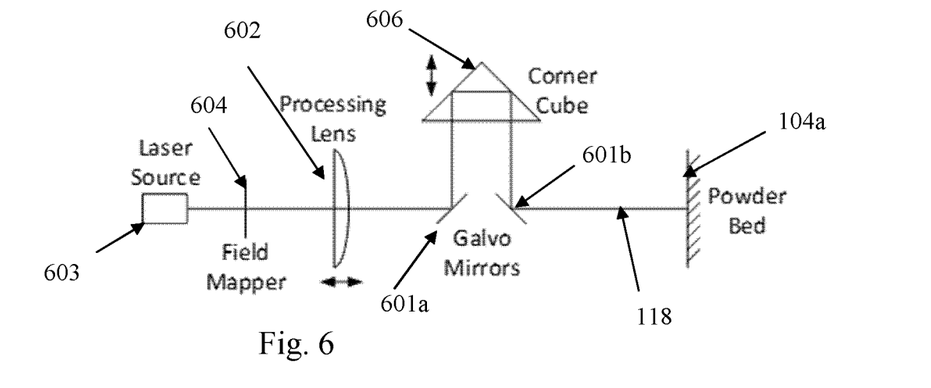
FIG. 6 shows an optical scanner according to a yet further embodiment of the invention.

FIG. 6 shows a further embodiment of an optical train. In this embodiment, an optical delay line in the form of a corner cube 606 has been added between the steering mirrors 601a, 601b. The corner cube is movable such that a path length for the laser beam between the two mirrors 601a, 601b can be varied. The corner cube 606 may be arranged to move back and forth by approximately 7.5 mm to provide an approximately 15 mm variable path length.

Figure 7:
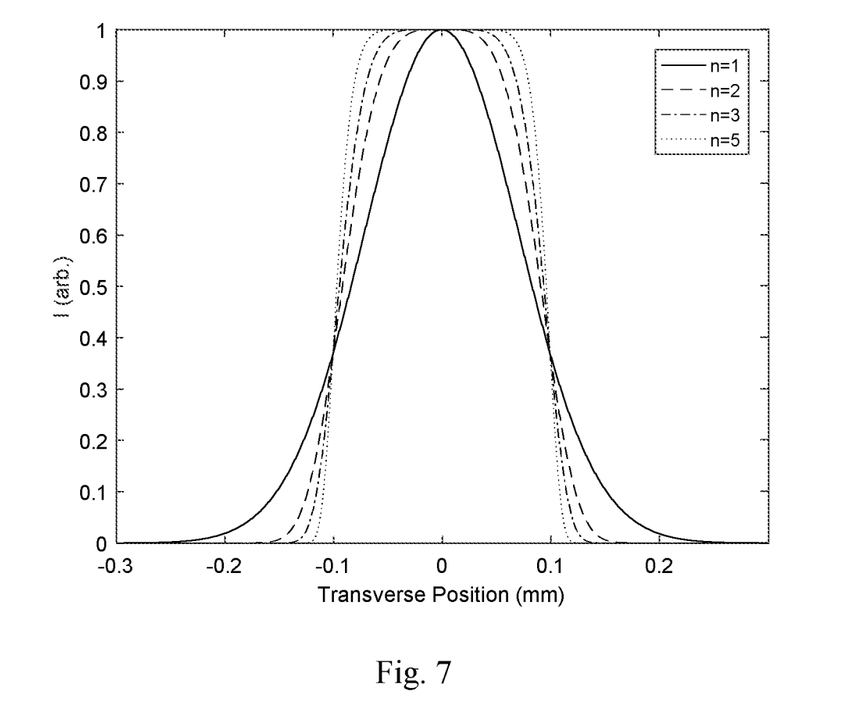
FIG. 7 is a graph showing a cross-section of Gaussian and super-Gaussian beam distributions with varying n.
Figure 8A:
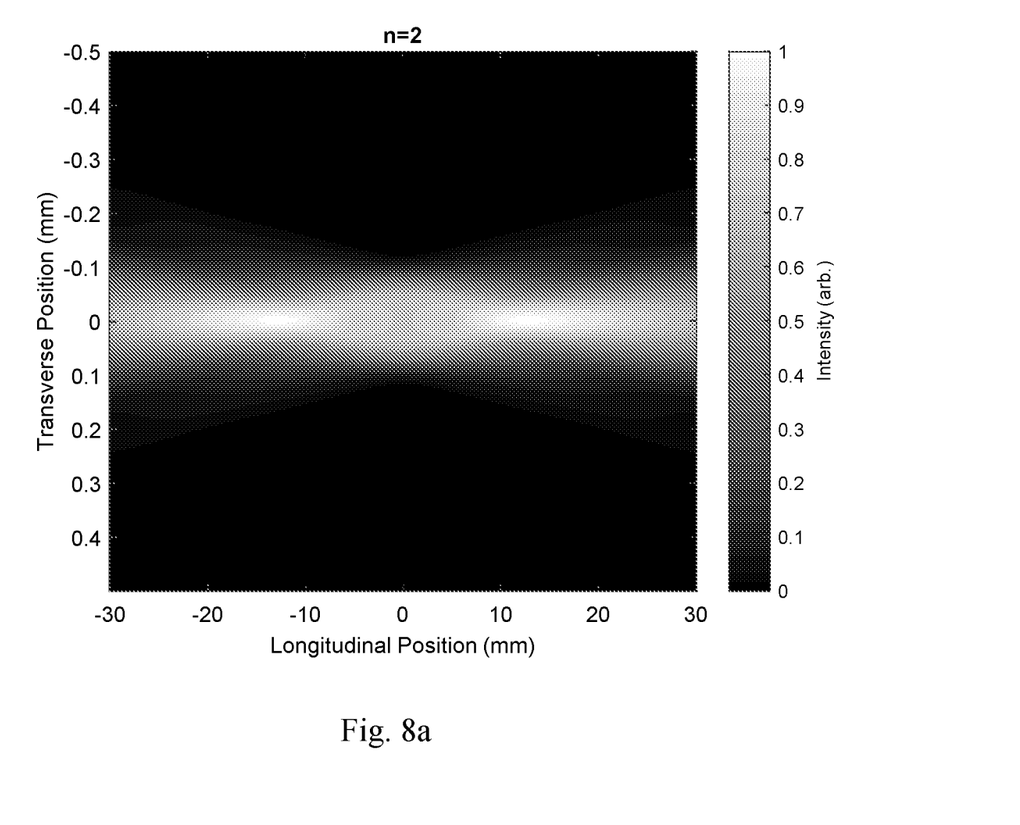
Figure 8B:
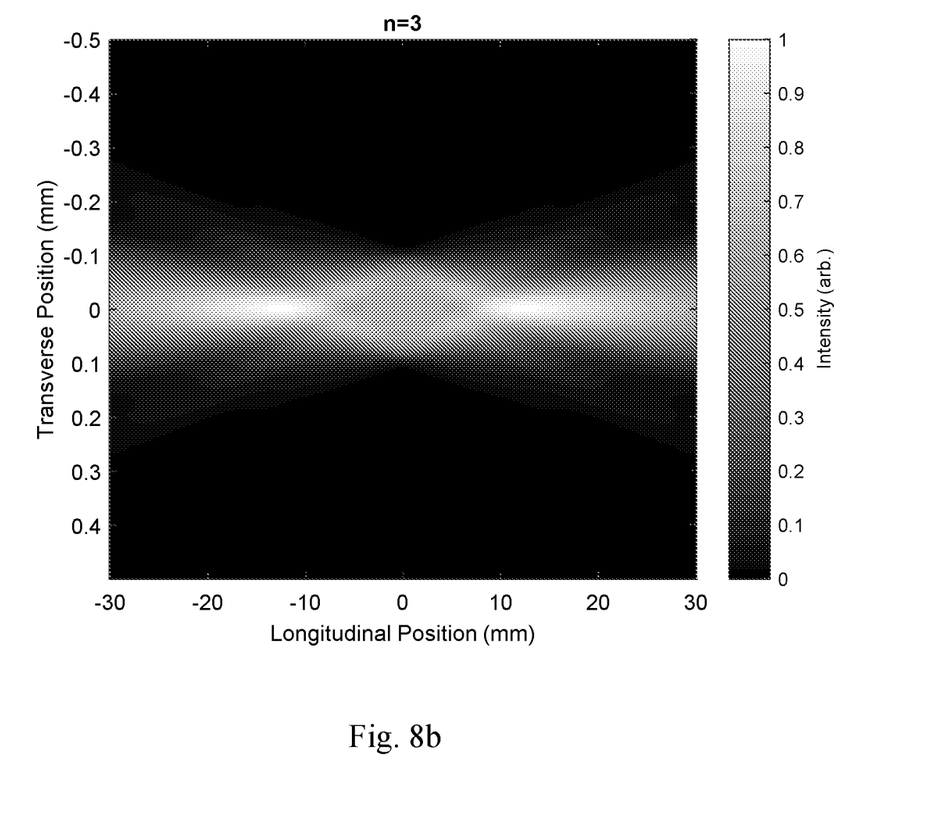
Figure 8C:
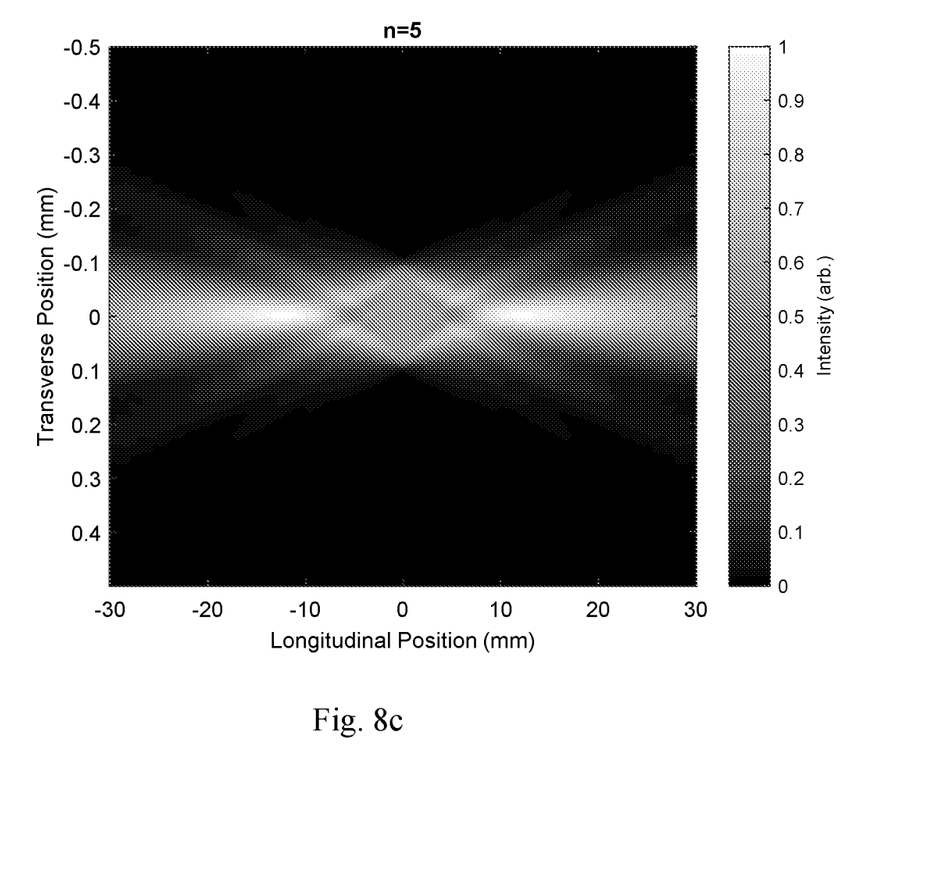
Figure 9:
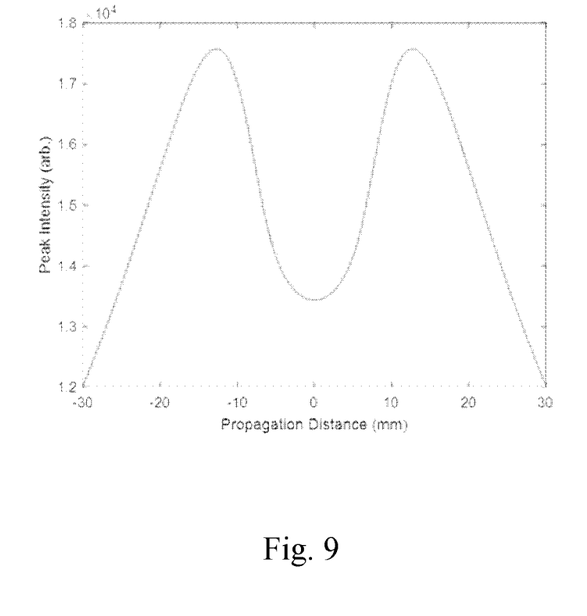
FIG. 9 shows a variation in peak intensity with propagation distance for a super-Gaussian of the order n=2.

Referring to FIGS. 7 to 9, the beam profile reshaping device is arranged to shape the Gaussian beam incident on the beam profile reshaping device into a super-Gaussian distribution. FIG. 7 shows how an order, n, of the super-Gaussian profile increases, a flatter topped transverse beam profile is achieved.

Unlike a Gaussian beam, the super-Gaussian distribution does not remain constant during propagation. Using a beam profile reshaping device to alter the phase of a Gaussian beam to form a super-Gaussian beam will only result in a super-Gaussian transverse beam profile at a single z-plane (with a certain depth of focus). Outside of this z-range, the distribution changes. FIGS. 8a, 8b and 8c shows the distribution achieved at varying z (propagation direction) for super-Gaussian beams of varying n. A super Gaussian (first) transverse beam profile is present at focus but in regions centred around +/−15 mm a (second) transverse beam profile becomes more Gaussian-like. As can be seen, lower values of n give greater depth of field for the different regions of the beam.

As n increases diffraction effects become more prominent, giving greater divergence and a less smooth transition from flat-top to Gaussian. Furthermore, the lower value of n, the fewer high frequency surface features are required for the beam profile reshaping device and, thus, the easier it is to form the beam profile reshaping device. Plotting the peak intensity with varying propagation distance, as shown in FIG. 9, shows the higher peak intensity in the Gaussian-like regions with a lower peak intensity in the flat-top, super-Gaussian region.

In use, the laser beam is scanned across the working surface to solidify selected areas of each powder layer to form a component. Adjustment of the scanning mirrors, voice coil and, if present, the spatial delay line, is controlled by computer 160. For different areas of powder at the working surface 104a, different transverse beam profiles, the flat-top or Gaussian-like beam profiles, are used for solidifying the powder material. To form fine lines, such as may be required around a border of an area, the Gaussian-like transverse beam profile may be used, whereas within a core of an area, the flat-topped transverse beam profile may be used. Adjustment of the type of transverse beam profile (Gaussian or flat-topped) located at the working surface can be achieved using the focussing optics controlled by the voice coils and/or movement of the corner cube, if present.

When switching between the two types of transverse beam profiles, the laser power may be adjusted.

In this way, large regions of a powder layer may be quickly solidified using the flat-topped profile at higher power but without significantly increasing an amount of material vaporised by the laser beam, whereas regions that require fine detail/lines, such as at the surface of the component can be formed using the narrow, Gaussian-like transverse beam profile. Such a technique may speed up the build whilst still achieving near 100% density of the part and a good surface finish.

Figure 10:
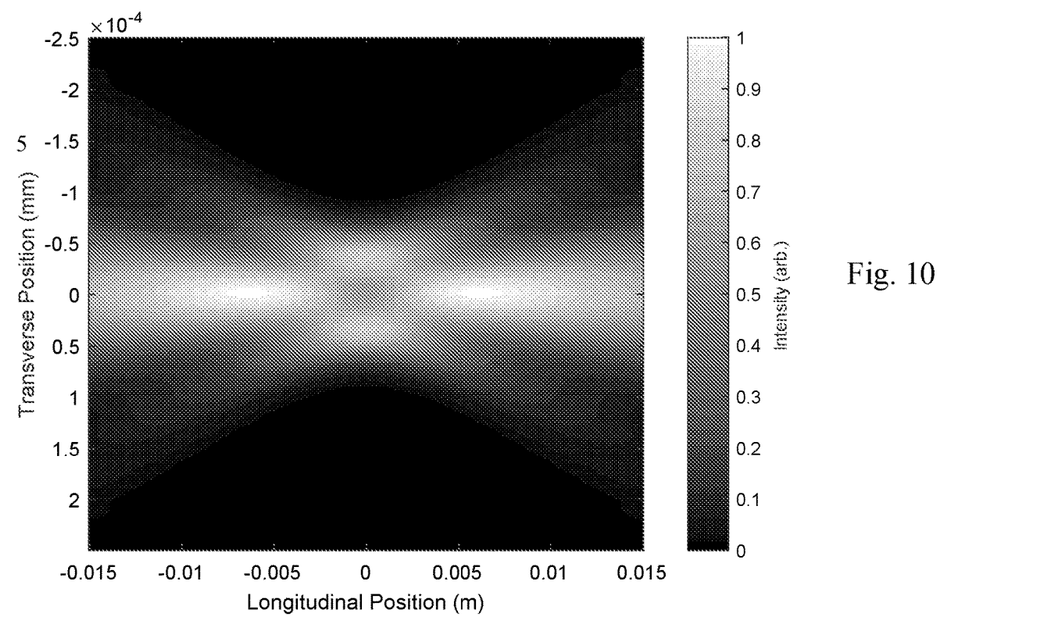
FIG. 10 is a plot showing variation in beam intensity with longitudinal position for a laser beam that produces a ring-like intensity distribution at focus and Gaussian-like beam profiles either side of the focus.
Figure 11:
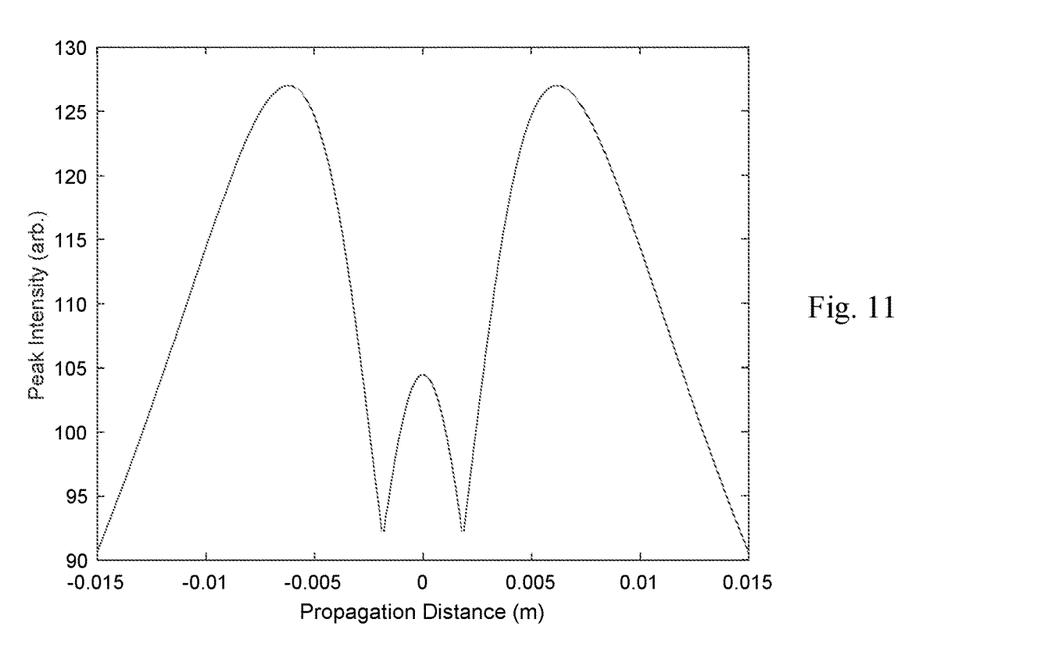
FIG. 11 shows a variation in peak intensity with propagation distance for the laser beam of FIG. 10.
Figure 12:
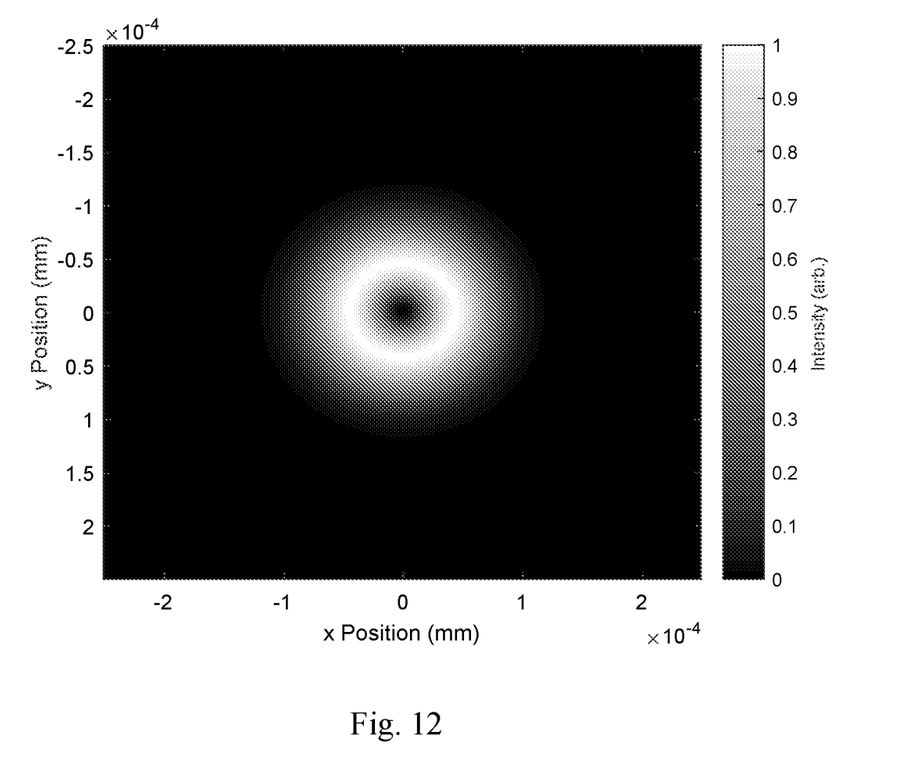
FIG. 12 is a plot showing the ring-like profile generated at focus.

Rather than reshaping the laser beam to form a super-Gaussian profile at the beam waist, a different, non-Gaussian profile may be formed. FIGS. 10 to 12 show a laser beam having a ring-shaped beam profile at the beam waist with Gaussian-like profiles either side of the beam waist. The ring-shaped beam profile may be desirable to reduce differential heating of powder material across the profile. In particular, with a circular spot (having a Gaussian or super-Gaussian beam profile), powder the is exposed, during scanning, to a central region of the spot may be heated more than powder heated only by an edge region of the beam profile, again potentially resulting in vaporisation of powder that is heated by the central region and/or powder that is heated only by the edge region not being melted. Using a ring-shaped profile may mitigate this problem.

A further beam profile that may be useful in additive manufacturing apparatus is a ring about a Gaussian spot. A peak intensity of the Gaussian spot may be higher than a peak intensity of the ring. It is believed that the ring may help to stabilise a melt pool formed by the central Gaussian spot.

In one embodiment, at least the shape of the laser "spot" formed by the laser beam on the powder at the waist of the laser beam is substantially rectangular, such as approximately square shaped (the shape of the spot being distorted as the laser beam is directed to be non-perpendicular with the powder layer). If a square or line shaped spot is used, then the scan paths may be selected based upon an orientation of the spot. For a square or line shaped spot, one would typically expect the spot to be scanned in a direction perpendicular to a side of the square or line shaped spot.

It will be understood that alterations and modifications may be made to the above described embodiments without departing from the scope of the invention as described herein. For example, the laser may be a fibre-laser, or a non-fibre laser, such as a diode pumped solid state laser or a direct diode laser.

The invention claimed is:

1. A method of laser processing comprising:
   generating a laser beam having, at different longitudinal positions in a propagation direction, first and second transverse beam profiles of energy density, the first transverse beam profile at a focal point of the laser beam having a flatter-top than the second transverse beam profile away from the focal point of the laser beam; and
   carrying out a scan of the laser beam across a working surface,
   wherein, during the scan, at least one of the laser beam and the working surface is adjusted to adjust a relative position of the working surface to the focal point such that, for a first part of the scan, the first transverse beam profile is located at the working surface and, for a second part of the scan, the second transverse beam profile is located at the working surface.

2. The method according to claim 1, wherein the first transverse beam profile is flatter than the second transverse beam profile in accordance with a measure of flatness.

3. The method according to claim 2, wherein the measure of flatness is one or more of a flatness factor, beam uniformity, plateau uniformity and edge steepness as defined within the EN ISO 13694-2001 standard.

4. The method according to claim 1, wherein the first transverse beam profile is flatter than a corresponding Gaussian profile having the same total and peak energies as the first transverse beam profile.

5. The method according to claim 1, wherein, in a plane transverse to the propagation direction, the first transverse beam profile comprises a ring about a central spot.

6. The method according to claim 1, wherein the laser processing comprises an additive manufacturing process, wherein the laser beam is used to solidify material to form a component, the method comprising using the second transverse beam profile to solidify material to form component surfaces and using the first transverse beam profile to solidify material to form a core of the component.

7. A controller for controlling a laser processing apparatus to carry out a method of laser processing according to claim 1.

8. A non-transient data carrier having instructions thereon, which, when executed by a processor of an apparatus, causes the apparatus to carry out a method of laser processing according to claim 1.

9. A method of laser processing comprising:
   generating a laser beam having, at different longitudinal positions in a propagation direction, first and second transverse beam profiles of energy density, the first transverse beam profile at a focal point of the laser beam being a super-Gaussian shape and the second transverse beam profile away from the focal point of the laser beam being a Gaussian shape; and
   carrying out a scan of the laser beam across a working surface,
   wherein, during the scan, at least one of the laser beam and the working surface is adjusted to adjust a relative position of the working surface to the focal point such that, for a first part of the scan, the first transverse beam profile is located at the working surface and, for a second part of the scan, the second transverse beam profile is located at the working surface.

10. The method according to claim 9, wherein the super-Gaussian shape is a second order super-Gaussian.

11. A controller for controlling a laser processing apparatus to carry out a method of laser processing according to claim 9.

12. A non-transient data carrier having instructions thereon, which, when executed by a processor of an apparatus, causes the apparatus to carry out a method of laser processing according to claim 9.

13. A method of laser processing comprising:
   generating a laser beam having, at different longitudinal positions in a propagation direction, first and second transverse beam profiles of energy density, the first transverse beam profile at a focal point of the laser beam being a super-Gaussian shape and having a flatter-top than the second transverse beam profile away from the focal point of the laser beam; and
   carrying out a scan of the laser beam across a working surface,
   wherein, during the scan, at least one of the laser beam and working surface is adjusted to adjust a relative position of the working surface to the focal point such that, for a first part of the scan, the first transverse beam profile is located at the working surface and, for a second part of the scan, the second transverse beam profile is located at the working surface.

14. The method according to claim 13, wherein the super-Gaussian shape is a second order super-Gaussian.

15. The method according to claim 13, wherein the first transverse beam profile is flatter than the second transverse beam profile in accordance with a measure of flatness.

16. The method according to claim 15, wherein the measure of flatness is one or more of a flatness factor, beam uniformity, plateau uniformity and edge steepness as defined within the EN ISO 13694-2001 standard.

17. The method according to claim 13, wherein the first transverse beam profile is flatter than a corresponding Gaussian profile having the same total and peak energies as the first transverse beam profile.

18. A controller for controlling a laser processing apparatus to carry out a method of laser processing according to claim 13.

19. A non-transient data carrier having instructions thereon, which, when executed by a processor of an apparatus, causes the apparatus to carry out a method of laser processing according to claim 13.

* * * * *